United States Patent [19]

Schroeder, Jr. et al.

[11] Patent Number: 5,062,484
[45] Date of Patent: Nov. 5, 1991

[54] METHOD OF GRAVEL PACKING A SUBTERRANEAN WELL

[75] Inventors: Donald E. Schroeder, Jr., Littleton; David O. Falk, Denver, both of Colo.

[73] Assignee: Marathon Oil Company, Findlay, Ohio

[21] Appl. No.: 572,925

[22] Filed: Aug. 24, 1990

[51] Int. Cl.⁵ .................. E21B 43/04; E21B 43/08
[52] U.S. Cl. ............................. 166/278; 166/205; 166/296; 166/300
[58] Field of Search ............... 166/276, 278, 296, 300, 166/205

[56] References Cited

U.S. PATENT DOCUMENTS

| | | |
|---|---|---|
| 3,216,497 | 11/1965 | Howard et al. |
| 3,268,001 | 8/1966 | Brandt |
| 3,277,962 | 10/1966 | Flickinger et al. |
| 3,361,203 | 1/1968 | Rensvold |
| 3,675,717 | 7/1972 | Goins, Jr. et al. ............ 166/278 |
| 3,880,233 | 4/1975 | Muecke et al. ............ 166/296 X |
| 3,999,608 | 12/1976 | Smith ............................. 166/278 |
| 4,018,283 | 4/1977 | Watkins ......................... 166/278 |
| 4,335,788 | 6/1982 | Murphy et al. ............... 166/278 |
| 4,552,215 | 11/1985 | Almond et al. ............... 166/278 |
| 4,703,799 | 11/1987 | Jennings, Jr. et al. ....... 166/276 |
| 4,730,674 | 3/1988 | Burdge et al. ............. 166/300 X |

Primary Examiner—George A. Suchfield
Attorney, Agent, or Firm—Jack L. Hummel; Jack E. Ebel

[57] ABSTRACT

A method of gravel packaging a well penetrating and in fluid communication with a subterranean formation or zone by sealing the apertures of a gravel pack liner, except near the bottom of the liner, against entry of slurry fluid. This prevents gravel from clogging the apertures or bridging the annulus between the liner and the well bore. An immobile gel provides the sealing function, and a breaker eventually breaks the gel, thereby permitting removal of the gel and unblocking the apertures. The gel is formed from a suitable liquid composition containing the gel breaker, and may be applied to the liner prior to lowering the liner and wash pipe into the well bore.

25 Claims, 4 Drawing Sheets

METHOD OF GRAVEL PACKING A SUBTERRANEAN WELL

FIELD OF THE INVENTION

The present invention relates to a method of gravel packing a well penetrating a subterranean formation, and more particularly, to a method of gravel packing a well penetrating a subterranean formation wherein an immobile gel is utilized to prevent fluid flow through a group of apertures in a liner.

BACKGROUND OF THE INVENTION

Producing sand with fluids from an unconsolidated subterranean oil or gas producing zone has long been a problem in the petroleum industry, causing erosion of production equipment and plugging of the well. Such conditions often result in reduced production levels or loss of well production entirely.

An effective means of combating the problem is the gravel pack, which involves placing a tubular liner in the well bore and packing gravel between the tubular liner and the well bore. The liner has slots or other apertures in its walls which are smaller in size than the gravel particles, thereby permitting formation fluids to flow through the slots while preventing entry of the gravel particles. A screen may be provided around the liner to cover the liner slots and thereby provide further assurance against the slots becoming plugged with gravel particles. As a result of improved gravel pack technology, including modern methods of predicting gravel size requirements, gravel packs have become quite effective in excluding sand from oil and gas production. In addition to this function, the gravel also assists in supporting the walls of uncased wells and preventing caving of loose material against the liner. Despite the effectiveness of gravel packs once they are properly placed and operating, the problem of installing a uniform gravel pack has not been satisfactorily solved.

Gravel is commonly mixed with a fluid, for example a liquid or a foam, to form a slurry. Typically, the slurry is transported in the well through the work string to a crossover tool which directs the slurry to the annulus between the liner and the well bore. The slurry continues down the annulus to the bottom of the well bore or to a sump packer in the well bore. Some of the fluid of the slurry flows through the apertures in the liner, enters the open bottom end of a wash pipe situated within the liner, and is returned to the surface through the crossover tool and work string. The balance of the slurry fluid flows into the subterranean zone penetrated by and in fluid communication with the well bore thereby depositing gravel against the subterranean zone.

The problem of depositing a uniform annular column of gravel can be attributed in part to the liner. The slurry fluid flows through the openings in the liner above the top of the deposited gravel, thus reducing the flow of slurry fluid down the annulus between the liner and the well bore. Slurry fluid flow through the liner results in gravel being deposited and subsequently bridging across portions of the annulus which prevents the flow of the slurry to the annulus below the bridge. Such bridging usually occurs near the top of the liner. Efforts have been made to correct this problem by various methods.

One proposal involves the use of large diameter wash pipes so that the annulus between the wash pipe and the liner is small, thus increasing the resistance to flow through this smaller annulus and causing the slurry fluid to preferentially flow down the annulus between the well bore and the liner rather than pass through the liner openings. This arrangement has not resulted in a completely satisfactory solution since it does not prevent bridging of the gravel.

Other suggestions involve plugging the liner perforations with cement or other material which is later removed by an acid treatment or other separate removal operation. Complicated liner designs involving special liner flanges or valves at every liner joint have also been proposed. In addition, it has been suggested in U.S. Pat. No. 3,999,608 to Smith to provide material such as a semi-solid gel between the wash pipe and the liner in order to temporarily plug the liner openings until the top of the gravel pack reaches the openings. At that point the semi-solid gel offers less resistance to flow than the gravel pack itself, resulting in the liquid breaking through the gel and flowing down to the open end of the wash pipe. These various methods, however, either slow the gravel packing operation or make it less efficient. In the case of the method utilizing semi-solid gel to temporarily plug the liner openings, the gel is purposely designed not to withstand the higher pressures sometimes encountered at locations other than at the perforations adjacent the top of the gravel pack, and so cannot be relied upon under all operating conditions.

It is therefore an object of the invention to cause slurries to have a consistent flow pattern and to prevent bridging of the gravel during a gravel pack operation.

A further object is to accomplish these goals by an economical and efficient process which does not slow the gravel placement process.

BRIEF SUMMARY OF THE INVENTION

In accordance with one embodiment of the present invention, an immobile gel is provided in the annulus between the wash pipe and the gravel pack liner to block a first group of apertures in the liner. When a slurry is introduced into the annulus between the liner and the well bore, the slurry fluid flows through a second group of unblocked apertures in the liner and into the wash pipe, causing the slurry fluid to flow through the deposited gravel and casing perforations and not through the liner apertures above the gravel column. This flow pattern allows gravel to be deposited from the slurry in a uniform manner without bridging the annulus between the liner and the well bore. The immobile gel may contain a breaker which breaks the gel to a low viscosity liquid upon completion of the gravel packing operation. The low viscosity liquid is removed from the liner. A preferred gel is a carboxylate-containing polymer crosslinked with a chromic carboxylate complex crosslinking agent such as an acrylamide polymer crosslinked with a chromic acetate complex.

A liquid composition capable of gelling to an immobile state may be introduced into the annulus between the gravel pack liner and the wash pipe to an annular seal near the bottom of the liner. This can conveniently be done while the liner and pipe are on the surface, and the liquid composition gels to an immobile state before these elements are placed in the well bore. The apertures in the liner below the seal remain unblocked thereby permitting flow of slurry fluid into the wash pipe during a gravel placement operation. Upon completion of gravel placement, the gel is removed from the liner apertures.

In another embodiment of the present invention, a screen is secured to the gravel pack liner so as to cover all of the apertures in the liner and the immobile gel is positioned between the exterior of the screen and the interior of the wash pipe.

The features enabling the method of the invention to provide the desired functions are brought out in more detail below in connection with the description of the preferred embodiment, wherein the above and other aspects of the invention, as well as other benefits, will readily be apparent.

DETAILED DESCRIPTION OF THE PREFERRED EMBODIMENTS

Figure 1:
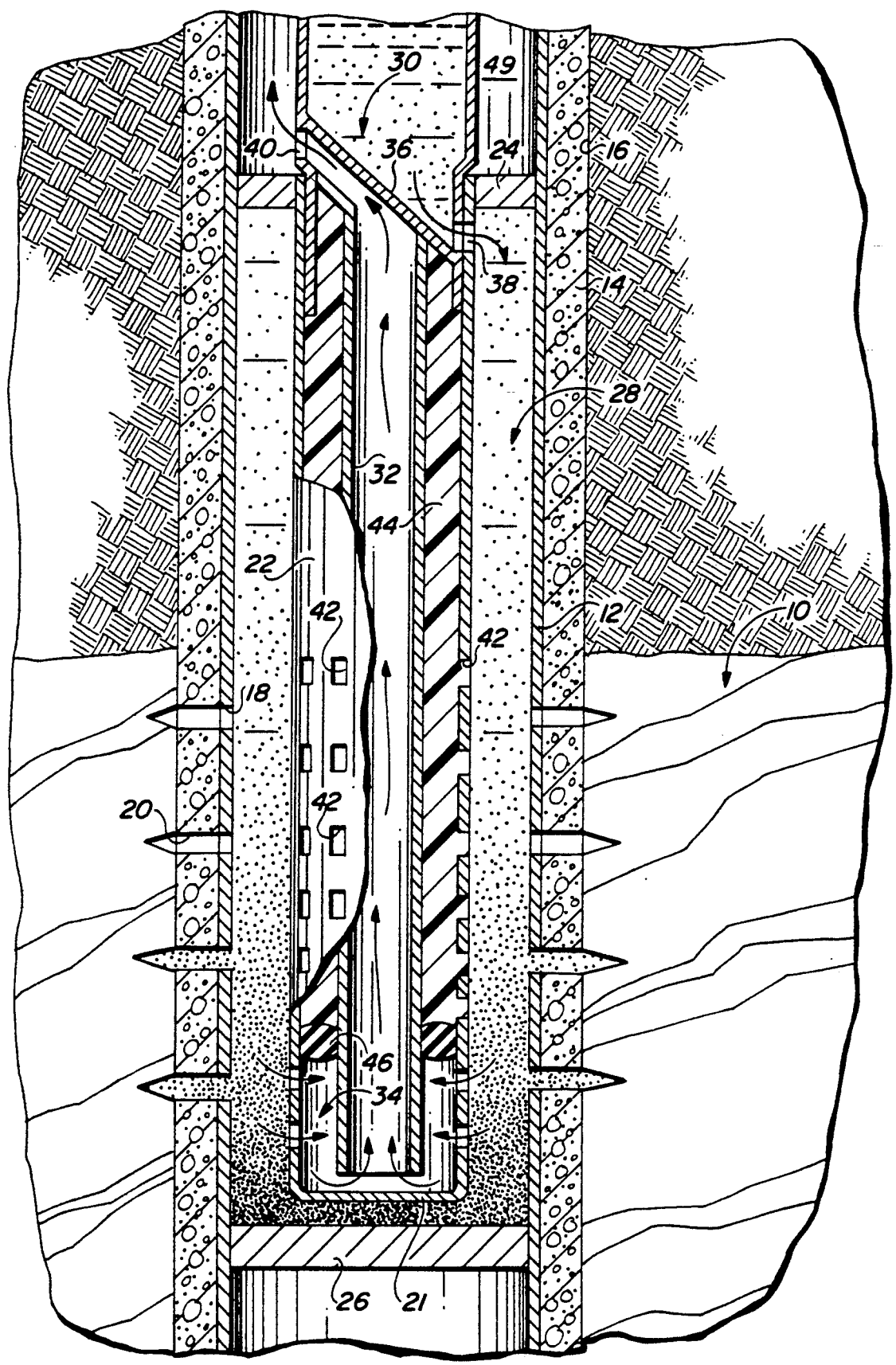
FIG. 1 is a schematic partial longitudinal sectional view of a well undergoing a gravel packing operation in accordance with one embodiment method of the present invention.

Referring to FIG. 1, a typical oil, water, and/or gas well which penetrates a subterranean formation 10 comprises a casing 12 cemented at 14 to the well bore 16. Perforations 18 and 20 in the casing and cement, respectively, permit fluid to be produced from formation 10. Although a cased well has been shown for purpose of illustration, it will be understood that the invention can also readily be used in connection with an uncased well. Accordingly, the term "well bore" as utilized throughout this specification refers to the area inside a cased or an uncased well. And although the well to which the process of the present invention is applied is normally a well from which oil, water and/or gas is produced, the process of the present invention may also be applied to a well through which fluid is also injected into a subterranean formation, such as a well used to perform a cyclic gas or steam huff and puff process.

A tubular liner 22 is supported by a packer 24 and extends down to a point which is spaced a short distance from a packer 26, for example, a sump packer or a packer separating zones in a multiple completion. It wil be understood that alternatively the liner could extend down to a point spaced a short distance from the bottom of the well bore instead of to an intermediate packer if the production formation 10 were adjacent the bottom of the well bore. The liner 22 is spaced from the casing 12 to created annulus 28.

A crossover tool 30 extends through packer 24 and includes wash pipe 32 spaced from the liner 22 to create annulus 34. The bottom of the wash pipe is spaced from the bottom wall 21 of the liner 22 to allow fluid present within the liner to enter the wash pipe. The crossover tool includes diverter means 36 for directing a slurry through ports 38 in the liner so as to enter the annulus 28 and to allow slurry fluid to flow from the wash pipe 32 through ports 40, and to the surface. The liner 22 includes apertures 42 through which production fluid flows during a production operation.

The structure described to this point is conventional in gravel packing operations. According to the present invention, however, most of the annulus 34 between the liner 22 and the wash pipe 32 is filled with an immobile gel 44 which blocks fluid flow through the adjacent apertures 42. The gel placement is preferably carried out at the surface where a liquid composition capable of maturing into an immobile gel is introduced into the annulus 34 of an assembly comprising the liner 22, the wash pipe 32 and the crossover tool 30. The liquid composition is prevented from flowing into the lower portion of the annulus 34 by annular seal 46, and may be prevented from flowing out the apertures 42 of the liner by any suitable means for temporarily covering them. Note that there are enough apertures 42 below the annular seal 46 to enable the carrier fluid to reach the wash pipe 32 during a gravel placement operation.

As utilized throughout this specification, "immobile gel" refers to a gel which will not be displaced from the annulus between a liner and a wash pipe by differential pressures which are encountered during a gravel packing operation. Any suitable gel composition that can form an immobile gel which is capable of breaking down and reverting to liquid form to permit its removal is suitable for use in the process of the present invention.

Gels of particular interest are those comprised of a carboxylate-containing polymer crosslinked with a crosslinking agent comprising a chromic carboxylate complex. The carboxylate-containing polymer may be any crosslinkable, high molecular weight, water soluble, synthetic polymer or biopolymer containing one or more carboxylate species. The average molecular weight of the carboxylate-containing polymer is in the range of about 10,000 to about 50,000,000, with the preferred range being about 100,000 to about 20,000,000.

The biopolymers which can be used include polysaccharides and modified polysaccharides. Exemplary biopolymers are guar gum and carboxymethylcellulose. Exemplary synthetic polymers include acrylamide polymers, such as polyacrylamide, partially hydrolyzed polyacrylamide and terpolymers containing acrylamide, acrylate and a third species. As defined herein, polyacrylamide is an acrylamide polymer having substantially less than 1% of the acrylamide groups in the form of carboxylate groups. Partially hydrolyzed polyacrylamide is an acrylamide polymer having at least 1%, but not 100%, of the acrylamide groups in the form of carboxylate groups. The acrylamide polymer may be prepared according to any of the well known conventional methods in the art. The preferred carboxylate-containing polymer is polyacrylamide or partially hydrolyzed polyacrylamide.

With respect to the chromic carboxylate complex crosslinking agent, the term "complex" means an ion or molecule containing two or more interassociated ionic, radical or molecular species. A complex ion as a whole has a distinct electrical charge while a complex molecule is electrically neutral. The term "chromic carboxylate complex" encompasses a single complex, mixtures of complexes containing the same carboxylate species, and mixtures of complexes containing differing carboxylate species.

The complex useful as a crosslinking agent includes at least one or more electropositive chromium III species and one or more electronegative carboxylate species.

Each complex optionally contains additional species which are not essential to the polymer crosslinking function of the complex, such as one or more water molecules or inorganic monovalent or divalent ions which function merely to balance the electrical charge of the complex.

Trivalent chromium and chromic ion are equivalent terms encompassed by the term "chromium III species" as used herein. The carboxylate species are advantageously derived from water soluble salts of carboxylic acids, especially low molecular weight mono-basic acids. Carboxylate species derived from salts of formic, acetic, propionic and lactic acid, lower substituted derivatives thereof and mixtures thereof are preferred. The carboxylate species include formate, acetate, propionate, lactate, lower substituted derivatives thereof and mixtures thereof, all of which are water soluble.

The complexes described and their method of preparation are within the purview of the skilled artisan. The preferred chromic carboxylate complex for use in this invention is chromic acetate complex.

A preferred gel suitable for use in the invention is one of polyacrylamide or partially hydrolyzed polyacrylamide crosslinked with chromic triacetate. Such a gel can be readily formulated as a low viscosity fluid having a broad range of strengths and gel onset times. For example, 2% polyacrylamide (PA) with chromic triacetate (CrAc) in a ratio of 20 PA:CrAc results in a suitable gel which is stable at 185° F. for a period of more than thirty days. By adding a breaker to the gel composition the gel will break down within a predetermined period of time, reverting to a nonviscous fluid. For example, ammonium persulfate or sodium nitrite, when incorporated in the gel composition in amounts from 1000 to 8000 ppm, broke gels between 20 and 30 days at 75° F. It will be understood that other formulations can be designed to break the gel in much less time, as low as a day, if desired. Thus the particular gel-breaker composition utilized can be selected to suit the time schedule of the gravel placement operation. In any event, it is preferred to install the liner and wash pipe assembly down hole immediately after the gel has been cured in the assembly at the surface and conduct the gravel pack operation to take full advantage of the predetermined break down time.

A number of different types of breakers may be used in connection with the gel system described above. In addition to the oxidizing agents mentioned, a number of other oxidizing agents such as sodium persulfate, sodium chlorate, sodium perchlorate and sodium perborate may be used. Other types of breakers which can be employed with the gel system include strong chemical breakers, such as hydrogen peroxide, sodium chlorite, perchloric acid and sodium peroxide; chelating agents, such as oxalic acid, citric acid, sodium tartrate and sodium citrate; and organic chemicals such as methylacetoacetate, ethylacetate, ethylacetoacetate and dichloroacetic acid. Those skilled in the art of gelation will recognize that other gel systems and associated breakers in addition to those mentioned may be utilized in the process of the present invention.

Referring again to FIG. 1, it will be understood that the assembly comprising the wash pipe 32, liner 22 and gel 44 will have been placed in the position illustrated after the gel has matured to an immobile state. Typically, the liquid gel-breaker composition may take four to six days to mature. During the gravel packing operation shown in FIG. 1, the slurry comprising gravel suspended in a fluid, for example a liquid or a foam, enters the annulus 28 from the crossover tool 30 and moves down toward the bottom of well bore 16, being unable to enter the apertures 42 covered by the gel 44. The slurry fluid enters the apertures 42 below the gel and flows up the wash pipe 32 to the surface, while the gravel in the slurry is deposited on the bottom of the annulus 28 and builds up to the desired level. The gravel is illustrated in FIG. 1 as having been built up to an intermediate level during the gravel packing operation, during which the slurry fluid has flowed uniformly around the liner screen without the gravel bridging during the operation.

Figure 2:
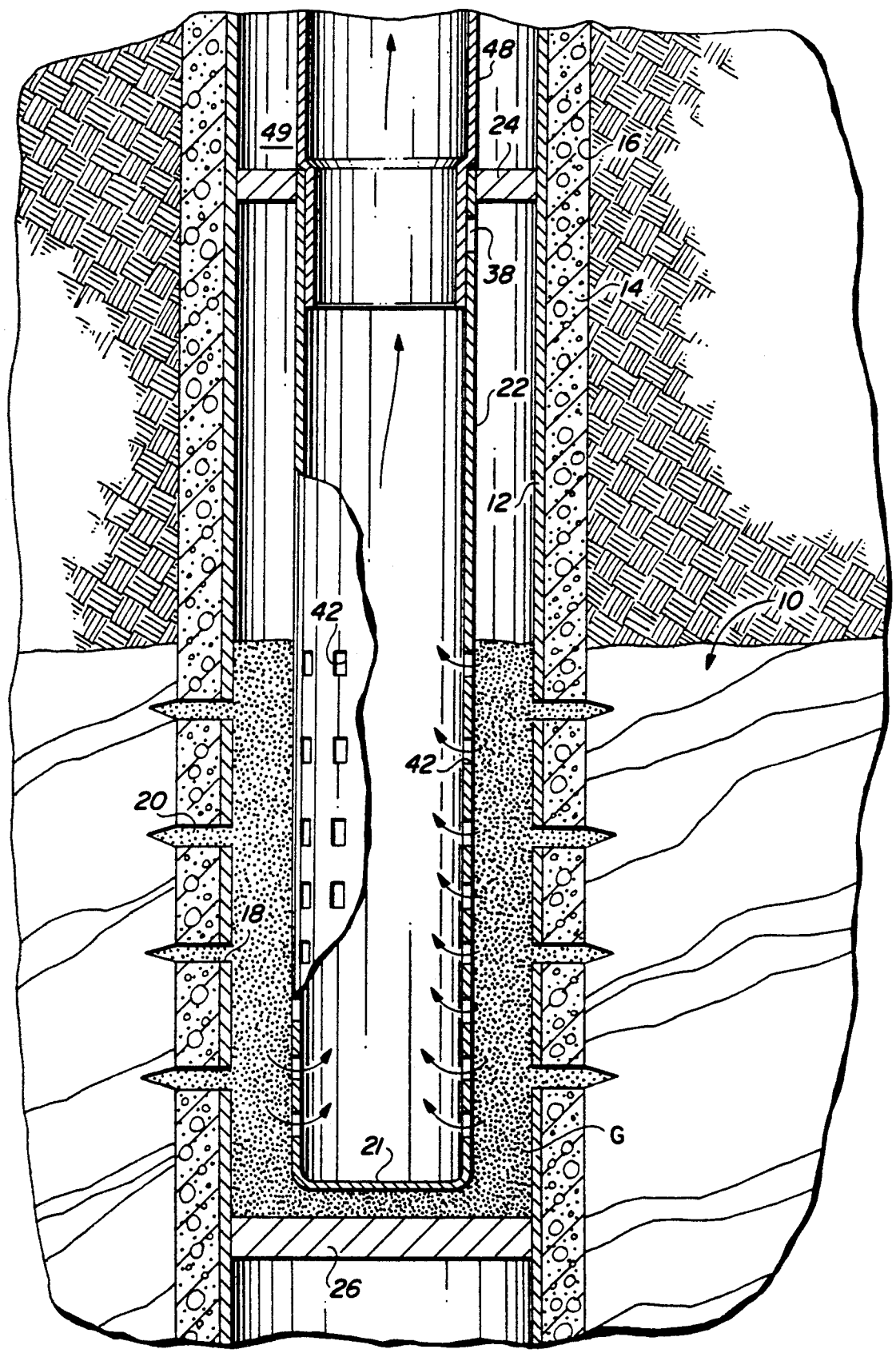
FIG. 2 is a schematic partial longitudinal view of the well of FIG. 1 during production, with the gravel pack in place.

After the gravel packing operation has been completed, the crossover tool 30 and the wash pipe 32 are removed. To complete the well in accordance with conventional well completion techniques, production tubing 48 is positioned within casing 12 and sealed to liner 22 below liner ports 38, as illustrated in FIG. 2. While the production tubing is being positioned but before the breaker in the gel has caused the gel to revert to a liquid, gel 44 advantageously reduces loss of fluid from annulus 49 above packer 24 to the formation. Once production tubing 48 is sealed to liner 22, formation fluid is produced through gravel pack G as shown in FIG. 2. The liquid composition resulting from the break-down of the gel is pumped back to the surface during production of the well.

Figure 3:
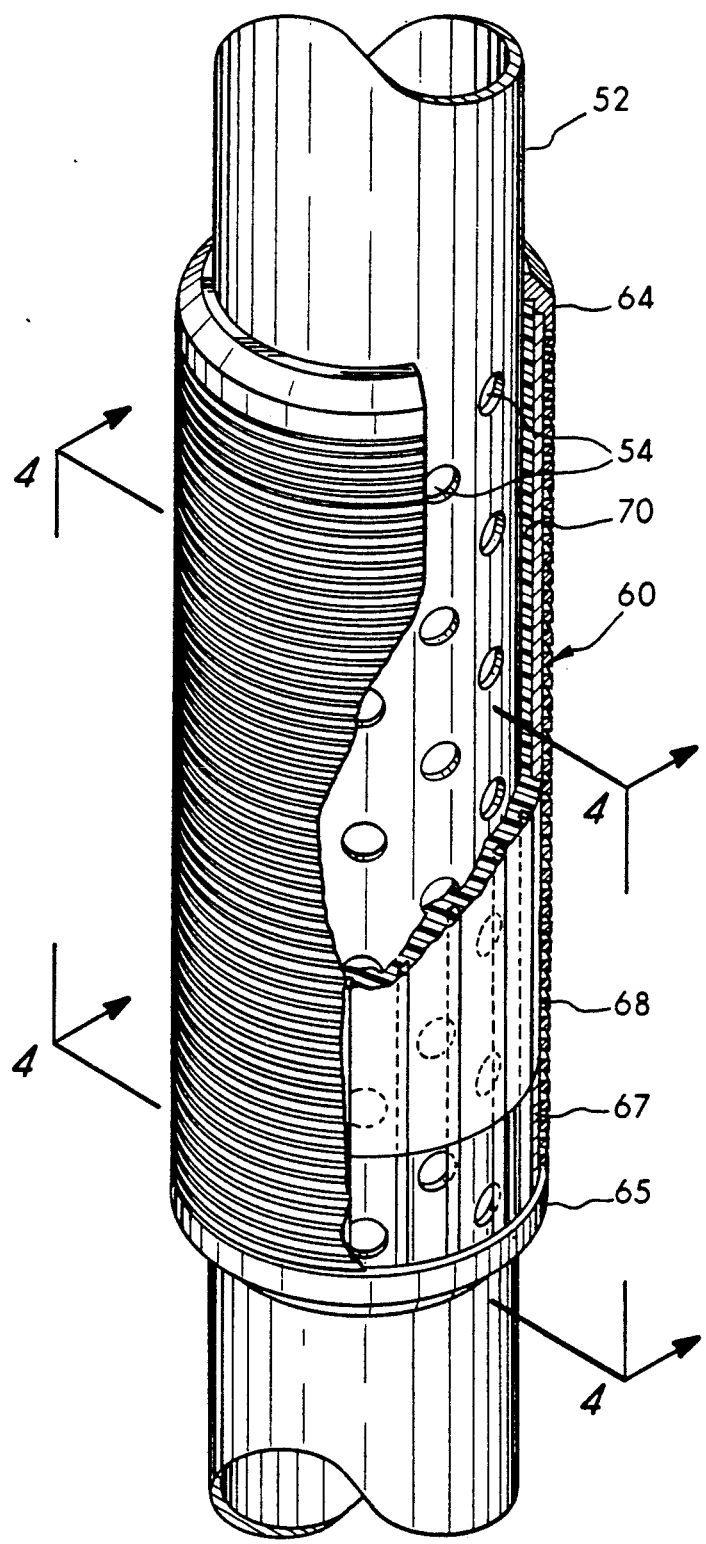
FIG. 3 is a partially cut away, schematic partial longitudinal view of another embodiment of the present invention.
Figure 5:
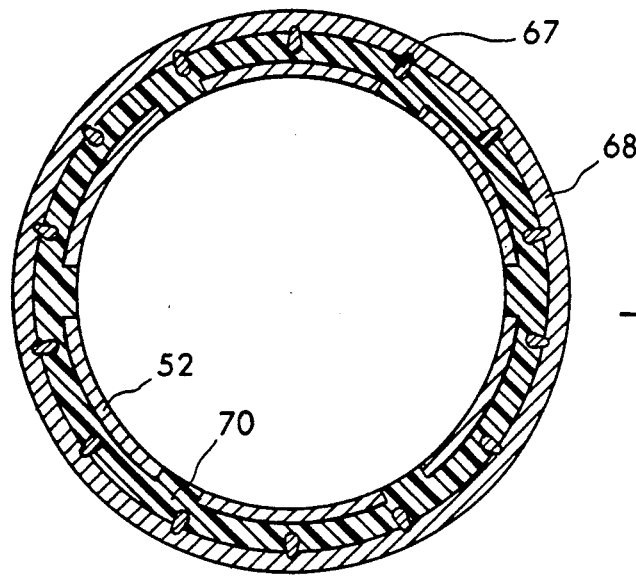
FIG. 5 is a cross sectional view taken along line 5—5 of FIG. 4.
Figure 4:
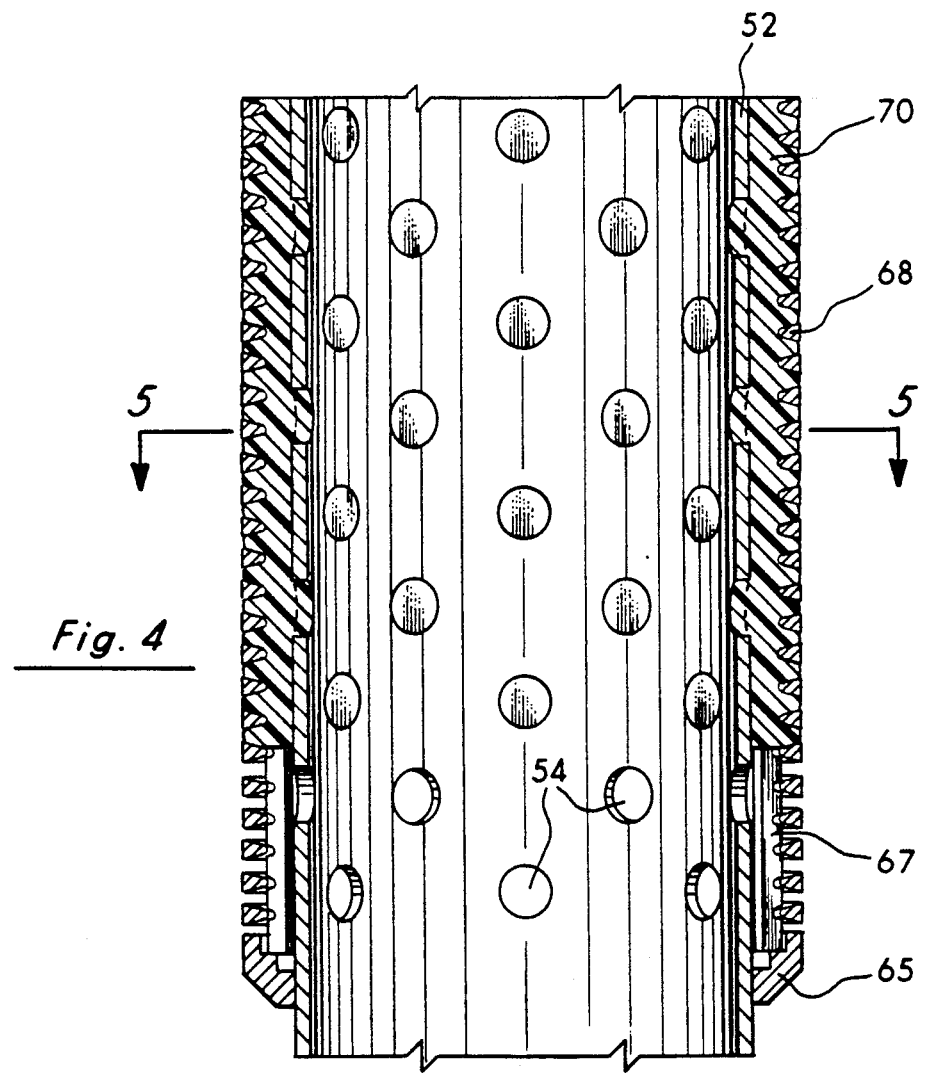
FIG. 4 is a cross sectional view taken along lines 4—4 of FIG. 3.

In another embodiment of the present invention illustrated in FIG. 3, a tubular liner 52 having a plurality of apertures 54 is utilized in lieu of tubular liner 22 for a gravel pack operation. A screen 60 is fixedly secured to liner 52 by any suitable means, such as by welds, so as to surround that portion of liner 52 having apertures 54 therethrough. Screen 60 comprises two end caps 64, 65, a plurality of longitudinally extending ribs 67, and a plurality of rings 68. One end of each rib 67 is fixedly secured to end cap 64 while the other end of each rib 67 is fixedly secured to end cap 65. Ribs 67 are substantially uniformly spaced about the circumference of each end cap 64, 65 and are provided with notches along the exterior thereof into which rings 68 are positioned and secured. In this embodiment, the annular space between the exterior of tubular liner 52 and the interior of screen 60 is filled with an immobile gel 70 as illustrated in FIGS. 3-5. Placement of immobile gel 70 may be accomplished in any suitable manner, such as by gravity or pressure displacement or by centrifugal force created by rotating the screen at the surface about its longitudinal axis while the exterior of the screen is covered with any suitable liquid impermeable material. As illustrated in FIGS. 3 and 4, the lowermost rows of apertures 54 in liner 52, e.g., a 2-10 foot section, are not covered by gel 70 to permit fluid flow therethrough. In operation, the assembly comprising wash pipe 32, liner 52, screen 60, and immobile gel 70 are positioned in a well after gel 70 has matured to an immobile state in a similar manner to that illustrated in FIG. 1. A slurry comprising gravel suspended in a fluid, for example a liquid or a foam, enters annulus 28 between casing 12 and liner 52 from crossover tool 30 and flows toward the bottom of well bore 16. The slurry fluid flows through screen 60 and those lowermost rows of apertures 54 in liner 52 which are not covered by gel 70 and up through liner 52 to the surface while gravel in the slurry is deposited from the bottom of annulus 28 up to a desired level to form a gravel pack similar to that illustrated as G in FIG. 2.

It will now be appreciated that the invention provides a simple, highly effective way to carry out a gravel packing operation through use of a gel-breaker system to block apertures in the liner during gravel deposition. The gel-breaker system advantageously reduces loss of fluid from the well bore above the packer during the installation of production tubing. The operation is economical and does not require lengthy preparations. The method of the present invention can be practiced utilizing a liner screen prepacked with sand or resin-coated sand and the immobile gel may be formed in the prepacked sand, as will be readily apparent to the skilled artisan. Further, the method of the present invention is equally applicable to known liner and screen designs other than those designs which are specifically illustrated herein.

It will also be appreciated that the invention is not necessarily limited to all the specific details described in connection with the preferred embodiment, but that changes which do not alter the overall basic function and concept of the invention may be made to certain features of the preferred embodiment without departing from the spirit and scope of the invention, as defined in the appended claims.

We claim:

1. A method of gravel packing a well bore penetrating a subterranean formation comprising:
   blocking a first group of apertures in a liner with an immobile gel;
   positioning said liner within the well bore thereby defining a first annulus between said liner and the well bore;
   transporting a slurry comprised of gravel suspended in a fluid into said first annulus, said fluid flowing through a second group of apertures in said liner while said gravel is deposited within said first annulus to form a gravel pack; and thereafter
   removing substantially all of said gel from said first group of apertures.

2. The method of claim 1 wherein said gel is removed from said first group of apertures by breaking the gel to a liquid.

3. The method of claim 1 wherein said first group of apertures are located above said second group of apertures when said liner is positioned within the well.

4. The method of claim 1 further comprising:
   positioning a wash pipe within said liner thereby defining a second annulus therebetween, said immobile gel being positioned in said second annulus.

5. The method of claim 4 wherein said gel is removed from said first group of apertures by breaking the gel to a liquid.

6. The method of claim 4 wherein the gel comprises a carboxylate-containing polymer crosslinked with a chromic carboxylate complex crosslinking agent.

7. The method of claim 6 wherein the polymer is an acrylamide polymer.

8. The method of claim 7 wherein the polymer is a polymer selected from polyacrylamide or partially hydrolyzed polyacrylamide, and the crosslinking agent comprises a chromic acetate complex.

9. The method of claim 1 wherein said liner has a screen secured thereto and positioned to cover said first and said second group of apertures, said immobile gel positioned between said screen and said liner.

10. The method of claim 9 wherein said gel is removed from said first group of apertures by breaking the gel to a liquid.

11. The method of claim 9 wherein the gel comprises a carboxylatecontaining polymer crosslinked with a chromic carboxylate complex crosslinking agent.

12. The method of claim 11 wherein the polymer is an acrylamide polymer.

13. The method of claim 12 wherein the polymer is a polymer selected from polyacrylamide or partially hydrolyzed polyacrylamide, and the crosslinking agent comprises a chromic acetate complex.

14. In a method of gravel packing a well bore in a subterranean fluid-producing zone wherein a tubular liner having apertures therein is positioned within the well bore so as to define a first annulus therebetween, a crossover tool is provided for directing a slurry of gravel to the first annulus, and a wash pipe is positioned within the liner so as to define a second annulus therebetween, the improvement comprising:
   providing an immobile gel above a predetermined point along the length of the liner to block the apertures above said predetermined point against the flow of fluid therethrough, leaving unblocked the apertures in the liner below said predetermined point, the immobile gel containing a gel breaker capable of breaking the gel to liquid form;
   introducing a slurry comprising gravel suspended in a fluid into the first annulus, the fluid of the slurry flowing through the unblocked apertures and into the wash pipe and the gravel of the slurry being deposited in the first annulus;
   allowing the gel breaker to break the immobile gel to a liquid; and
   removing the liquid from the block apertures.

15. The method of claim 14 wherein said immobile gel is positioned within the second annulus.

16. The method of claim 15 wherein the step of providing the immobile gel comprises:
   introducing a liquid composition capable of gelling to an immobile state into the second annulus, said liquid composition containing a gel breaker, and allowing the liquid composition to gel.

17. The method of claim 14 wherein the tubular liner has a screen secured thereto which covers the apertures, said immobile gel being positioned between the exterior of said screen and the interior of said tubular liner.

18. The method of claim 17 wherein the step of providing the immobile gel comprises:
   introducing a liquid composition capable of gelling to an immobile state between the screen and the liner, said liquid composition containing a gel breaker, and allowing the liquid composition to gel.

19. The method of claim 14 wherein the gel comprises a carboxylate-containing polymer crosslinked with a chromic carboxylate complex crosslinking agent.

20. A method of gravel packing a well penetrating a subterranean zone comprising:
   positioning a wash pipe within a gravel pack liner having apertures therein;
   forming an immobile gel in an upper portion of an annular space which is adjacent to a gravel pack liner thereby blocking a first upper group of apertures in said liner to fluid flow;
   introducing a slurry comprising gravel suspended in a fluid into an annulus between the liner and the well, the slurry fluid flowing through a second lower group of apertures in said liner and into a wash pipe positioned within said liner, the gravel being deposited in the annulus between the liner and the well bore;

causing the immobile gel to revert to a liquid; and removing the liquid from said liner.

21. The method of claim 20 wherein said annular space is between said liner and said wash pipe.

22. The method of claim 21 wherein said annular space is sealed at a point intermediate the length thereof to divide the annular space into an upper portion and a lower portion.

23. The method of claim 20 wherein a screen is secured to said liner to cover said first and said second group of apertures, said annular space being between the exterior of said screen and the interior of said liner.

24. The method of claim 20 wherein the gravel pack liner is positioned in the well bore after said immobile gel has matured.

25. The method of claim 20 wherein the immobile gel is caused to revert to the liquid by a gel breaker included in a liquid composition from which said immobile gel is matured.

* * * * *